July 1, 1930.   S. A. STAEGE   1,768,939
WINDER MOTOR DRIVE CONTROL SYSTEM
Filed July 16, 1929
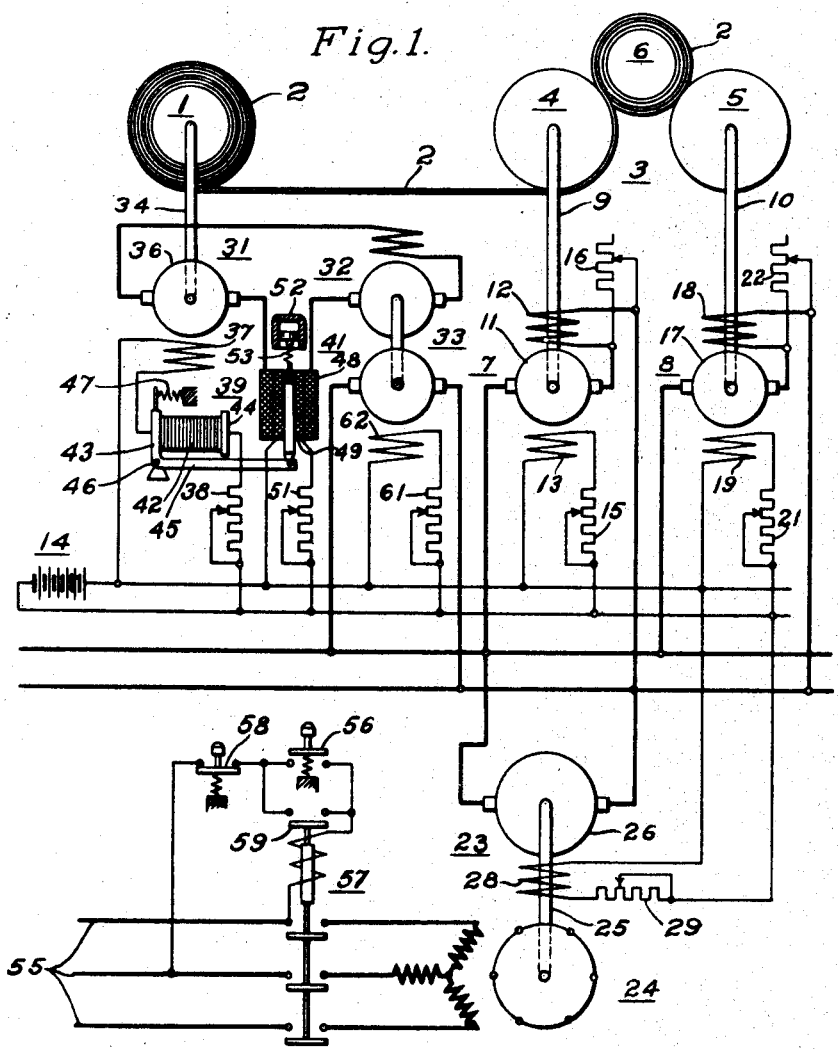
INVENTOR
Stephen A. Staege.
BY
*Wesley G. Carr*
ATTORNEY Patented July 1, 1930

1,768,939

UNITED STATES PATENT OFFICE

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA

WINDER-MOTOR DRIVE-CONTROL SYSTEM

Application filed July 16, 1929. Serial No. 378,594.

My invention relates to control systems, and particularly to systems for governing the operation of winders.

An object of my invention is to provide a winder-motor drive system that shall be simple in construction and efficient in its operation.

Another object of my invention is to provide a system for maintaining substantially constant tension in material as it passes from a supply reel to a winder roller.

A further object of my invention is to provide tension developing means that shall be operable to maintain substantially constant tension in material as it is unwound from a supply reel and wound upon a winder roller, and also to develop power for motive means disposed to drive the winder roller.

It is also an object of the invention to provide for utilizing the energy expended in performing tensioning or braking operations to generate electrical energy which may be utilized for doing useful work.

Other objects of my invention will be apparent to those skilled in the art, from the following description taken in conjunction with the accompanying drawings, in which, Figure 1 is a diagrammatic view of circuits and apparatus arranged in accordance with my invention, and Fig. 2 is a diagrammatic view showing the circuit connections of a modified form of my invention.

Referring to Fig. 1 of the drawings, a supply reel 1, having material 2, such as paper, wound thereon, and a winder 3 are shown.

The winder 3 comprises two rollers 4 and 5, and a core 6 disposed between the rollers in tangential relation therewith.

When material is to be unwound from the supply reel 1 and wound upon the core 6, the material 2 is drawn from the reel, inserted under the roller and wound upon the core 6.

The roller 4 is disposed to draw or pull the material 2 from the supply reel 1 and feed it to the core 6, upon which it is wound; and the roller 5 is disposed to control the degree of hardness or tightness with which the material is wound upon the core. When so driven the roller 5 may slip slightly with respect to the material on the core, but as the weight of the roll increases the slip will decrease.

The respective rollers 4 and 5 of the winder may be driven by direct current motors 7 and 8 through shafts 9 and 10.

The motors 7 and 8 may be of the compound-wound type or any other type having a drooping characteristic speed-torque curve. As shown, the motor 7 comprises an armature 11, a series field winding 12, and a separately excited field winding 13. The separately excited field winding 13 may be energized by direct current from a suitable source of power, as for example, a battery 14. The current in the field winding 13 may be adjusted to any predetermined value by means of a variable resistor 15 disposed in series-circuit relation to the winding, whereby the speed of the motor may be adjusted according to the requirements of the operation of the winder 3.

In order that the drooping characteristic of the motor 7 may be adjusted, a variable resistor 16 is provided and disposed in shunt or parallel-circuit relation to the series field winding 12.

The motor 8 is similar in construction to the motor 7 and comprises an armature 17, a series field winding 18, and a separately excited field winding 19. The field winding 19 may be energized by direct current from the battery 14.

In order to adjust the motor 8 for operation at a predetermined speed, a variable resistor 21, disposed in series-circuit relation to the field winding 19, is provided, whereby the current in the winding may be regulated or adjusted according to the speed of operation required of the motor.

Since the drooping characteristic of the motor 8 corresponds to that of the motor 7, in order that the torques developed by the respective motors may be either equal in value or bear a constant relation to one another, a variable resistor 22 is disposed in shunt or parallel circuit relation to the series field winding 18.

Power may be supplied to the motors 7 and 8 from a power or main generator 23. As shown, the generator 23 is arranged to be driven by an alternating current motor 24 through a shaft 25. The generator 23 may be of the separately excited type and comprises an armature winding 26 and a separately excited field winding 28. The field winding 28 is arranged to be connected across the battery 14. In order to vary the voltage developed by the generator 23, a variable resistor 29 is connected in series-circuit relation with the field winding 28 whereby the current in the winding may be adjusted to any predetermined value.

With a view to meeting the requirements of the trade, the rolls of material coming from the winder 3 must be uniformly wound in order that the roll will be of the same degree of tightness or hardness from the center to the outside. In order that the rolls coming from the winder may be of uniform hardness throughout, the motors 7 and 8 may be adjusted to develop different predetermined relative torques by regulating the current in the respective separately-excited field windings 13 and 19.

Where rolls of uniform hardness throughout are desired, the current in the field winding 19 of the motor 8 may be so adjusted that it will develop a higher torque than the motor 7. When the roll of material on the core 6 is small and light in weight (the motor 8 being disposed to develop a higher torque than the motor 7) the roller 5 will cause the material 2 to be wound tightly and smoothly on the core 6. As the roll becomes larger in diameter and heavier in weight, a greater torque will be demanded of the motor 8 because of the increased frictional force exerted by the roll of material upon the roller 5 of the winder. Since the torque demanded of the motor 8 is greater, the motor will run at a lower speed which will be determined by its drooping characteristic speed-torque curve. This speed may be only slightly greater than the speed of operation of the motor 7.

In order to provide for maintaining tension at a predetermined value in the material between the supply reel 1 and the roller 4, an auxiliary generator 31, a series motor 32 and a dynamo-electric machine 33 are provided. As shown, the generator 31 is arranged to be driven by the supply reel 1 through a shaft 34 and the motor 32 is disposed to drive the dynamo-electric machine 33 which is connected in parallel-circuit relation to the main generator 23. The auxiliary generator 31 is connected across the series motor 32; accordingly the generator 31 receives mechanical energy from the supply reel 1, which is driven by the motors 7 and 8 through the material 2 and returns it, as electrical energy, to the series motor 32. The series motor 32 is disposed to convert the electrical energy into mechanical energy by driving the dynamo-electric machine 33. Since the machine 33 is connected in parallel-circuit relation to the main generator 23, the power which is expended in driving the auxiliary generator 31 is returned to the motors 7 and 8 as electrical energy except for the losses in the auxiliary generator 31, the series motor 32 and the dynamo-electric machine 33.

According to this arrangement, the auxiliary generator 31 acts as a drag or tensioning device upon the supply reel 1 whereby the required tension in the material 2 is obtained. In the event that the material 2, extending between the supply reel 1 and the winder 3, is broken, the auxiliary generator 31 will operate to stop the reel 1 very quickly because the torque or driving force for the armature of the generator is removed and material will not be unwound. In this system the motor 32 will be driven by the machine 33 acting as a motor when the generator 31 is not developing any voltage. Since the motor 32 is a series motor, it cannot function as a generator to effect the operation of the auxiliary generator 31 as a motor.

The auxiliary generator 31 comprises an armature winding 36, and a separately excited field winding 37. In order to vary the current in the field winding 37 in accordance with the tension required to be maintained in the material 2 for a given diameter or roll of material on the supply reel 1, a variable resistor 38 is provided and disposed in series-circuit relation to the winding.

In order to maintain the tension in the material 2 constant, at a predetermined value, it is required that the voltage developed by the generator 31 shall be maintained constant at a predetermined value. Since the generator 31 will be driven at increasingly higher speeds as the diameter of the roll on the supply reel 1 becomes smaller, the voltage developed will increase in proportion to the increase in speed. If the current in the field winding 37 is maintained at a predetermined value, it follows that the voltage developed by the auxiliary generator 31 will also increase in value; therefore, the tension in the material will increase.

The voltage of the auxiliary generator 31 may be maintained at a constant predetermined value, by means of a variable rheostat 39 which is disposed to decrease the current in the field winding 37 as the speed of rotation of the supply reel 1 increases. Accordingly, a solenoid 41 is provided for varying the rheostat 39 in accordance with the current delivered by the generator 31 to the series motor 32, which current is a function of the speed of rotation of the supply reel 1.

The rheostat 39, may be of any suitable type and in this instance a rheostat of the carbon pile type having a plurality of discs 42 provided and is disposed between terminals 43 and 44. As shown the rheostat is connected in series-circuit relation to the field winding 37 and the variable resistor 38 across the battery 14. In order to vary the pressure on the discs 42, to change their ohmic resistance, a lever 45 that is pivotally mounted at 46 has one end secured to the terminal 43. The solenoid 41 is disposed to actuate the lever 45 in such direction that the pressure on the discs may be reduced. A spring 47 is provided for so biasing the lever 45 that the discs are normally pressed tightly together when the solenoid 41 is deenergized.

The solenoid 41 comprises two windings 48 and 49. The winding 48 is disposed in series-circuit relation to the armature 36 of the auxiliary generator 31 and the series motor 32. The lever 45 will, therefore, be actuated in accordance with the current in the armature of the generator 31 in order that the current in the field winding 37 of the generator may be varied in inverse proportion. The winding 49 of the solenoid may be energized by current from the battery 14 whereby the sensitivity of the solenoid to variations of current in the armature of the generator 31 may be modified. The current in the winding 49 may be varied by means of a variable resistor 51 disposed in series-circuit relation to the winding.

When the roll of material disposed on the supply reel 1 is of a maximum diameter, the current in the field winding 37 may be adjusted to such value that the value of the voltage developed by the generator 31 will be that required to give the proper tension desired in the material. As the diameter of the roll of material becomes smaller, the voltage developed will tend to increase, thereby causing the current in the winding 48 of the solenoid to increase. In response to the increase of current in the winding 48, the lever 45 will be so actuated that the pressure between the discs 42 will be decreased; therefore, the current in the field winding 37 will be decreased, whereby the voltage of the generator is reduced to the adjusted or desired value. In order to prevent hunting of the rheostat 39, a dash pot 52 is connected to the core or armature of the solenoid 41 through a spring 53.

If it be assumed that material 2 is to be wound upon the cylindrical core 6 of the winder 3, the material is first unwound from the reel 1 until a few turns of material are wound upon the core 6. The motor 24 may now be started to continue the winding operation, by connecting it to a 3-phase source of alternating current power 55.

In order to connect the motor 24 to the source of power 55 a push-button switch 56 is provided. When the push button switch 56 is actuated to its circuit closing position, an energizing circuit for the actuating coil of a switch 57 is established. This circuit extends from one of the conductors of the power supply 55 through a stopping push-button switch 58, the push-button switch 56 and the actuating coil of the switch 57 to another of the conductors of the 3-phase power supply. Upon the closure of the switch 57, a holding circuit for the actuating coil of the switch is completed that bridges the contact members of the starting push-button switch 56. This bridging circuit is completed by means of a back contact member 59 which is actuated by the switch 57.

When the motor 24 has been connected across the 3-phase power supply 55, the generator 23 will be driven at a definite speed and will develop a voltage which may be adjusted to any desired value depending upon the voltage required for the proper operation of the motors 7 and 8. As the motor 24 accelerates from stand-still to full running speed, the voltage developed by the generator 23 will vary from zero to its operating voltage corresponding to the full running speed of the motor 24. As the voltage increases, the motors 7 and 8 will accelerate from a stand-still condition to full running speed.

As the paper or material 2 is wound upon the core 6 the supply reel 1 will be driven through the mechanical connection which is affected by the material 2. The generator 31 will, therefore, develop a voltage that is proportional to the speed of rotation of the supply reel 1. Since the motor 32 is a series motor, it will operate at a speed that is limited by the torque which it is capable of developing for a given voltage impressed across its armature and series field winding; therefore, the motor 32 will cause the dynamo-electric machine 33 to operate as a generator whenever the auxiliary generator 31 is developing a voltage sufficient to overcome the RI drop in the circuit comprising the armature of the generator 31, the series field winding and the armature of the motor 32 and the winding 48 of the solenoid 41 and the friction of the bearings of the motor 32.

If the generator 23 is operating at full voltage and the generator 31 is not developing a voltage, the machine 33 will operate as a motor to drive the series motor 32. However, since the motor 32 is a series motor it cannot develop a voltage and thereby cause the generator 31 to act as a motor.

The voltage developed by the machine 33 may be varied by means of a variable resistor 61 that is disposed in series circuit relation to a separately excited field winding 62 of the machine 33. In this manner the maximum torque developed by the series motor 32 may be adjusted. The field winding 62 may be energized by direct current from the battery 14.

When the motors 7 and 8 are connected in parallel-circuit relation, as shown in Fig. 1, the current in the field winding 19 of the motor 8 is adjusted to a lower value than that in the winding 13 of the motor 7; therefore, when the full voltage is applied, the motor 8 will tend to operate at a higher speed and will, accordingly, develop a greater torque than the motor 7. During the acceleration of the motors, however, the motor 8 may develop a lower torque because of the fact that the field flux is weaker than that of the motor 7.

Where the requirements are such that the relative torques developed by the motors 7 and 8 shall be maintained at a fixed ratio, from stand still and through the acceleration period, the armatures 11 and 17 of the motors may be connected in series-circuit relation, as shown in Fig. 2. In such arrangement, the current in the field windings 13 and 19 may be so adjusted that the motor 8 will develop a greater torque than the motor 7. Since the armature windings of the motors are connected in series circuit relation, the current in both armatures will be equal. In this case, the motor 8 will develop a higher torque than the motor 7 during the starting period because the current in the field winding 19 is greater than that in the field winding 13, and when the generator 23 is developing full voltage, the motor 7 will tend to run slower than the motor 8 and develop a lower torque.

Various modifications may be made in the system herein disclosed without departing from the spirit and the scope of my invention. It is desired, therefore, that the specific embodiment of my invention shall be interpreted in an illustrative, but not in a limiting sense.

I claim as my invention:

1. In a roll winding system, in combination, a supply reel for material, a plurality of rollers disposed to carry a core in tangential relation therewith, upon which core material may be wound from the supply reel, a motor for driving each of said rollers, a main generator for supplying power to said motors, a motor for driving said main generator, a dynamo-electric machine connected in parallel circuit relation to said main generator, a series motor for driving said machine, and an auxiliary generator, disposed for operation by said material supply reel and connected across said series motor, said auxiliary generator acting as a drag upon the supply reel when material is unwound therefrom, said series motor being disposed to drive said machine whereby the power expended in driving said auxiliary generator is returned to said roller driving motors.

2. In a roll winding system, in combination, a supply reel for material, a plurality of rollers disposed to carry a core in tangential relation therewith, upon which core material may be wound from the supply reel, a motor for driving each of said rollers, a main generator for supplying power to said motors, a motor for driving said main generator, a dynamo-electric machine connected in parallel circuit relation to said main generator, a series motor for driving said machine, an auxiliary generator, disposed for operation by said material supply reel and connected across said series motor, said auxiliary generator acting as a drag upon the supply reel when material is unwound therefrom, said series motor being disposed to drive said machine whereby the power expended in driving said auxiliary generator is returned to said roller driving motors, and means for regulating the current developed by said auxiliary generator in accordance with changes in the diameter of material on said supply reel whereby the "drag" effect of said auxiliary generator may be maintained at an approximately constant value.

3. In a roll winding system, in combination, a supply reel for material, a plurality of rollers disposed to carry a core therebetween in tangential relation therewith, upon which core material may be wound from the supply roll, a motor for driving each of said rollers, a main generator for supplying power to said motors, an auxiliary generator connected in parallel-circuit relation to said main generator, a series motor for driving said auxiliary generator, a drag generator connected to said material supply reel and disposed to be driven thereby, said drag generator being effective to act as a tensioning device upon said material as it is unwound from said reel, and means connecting said drag generator across said series motor.

4. In a roll winding system, in combination, a supply reel for material, a plurality of rollers disposed to carry a core therebetween in tangential relation therewith, upon which core material may be wound from the supply reel, a motor for driving each of said rollers, a main generator for supplying power to said motors, an auxiliary generator connected in parallel-circuit relation to said main generator, a series motor for driving said auxiliary generator, a drag generator connected to said material supply reel and disposed to be driven thereby, said drag generator being effective to act as a tensioning device upon said material as it is unwound from said reel, means connecting said drag generator across said series motor, and means for regulating the current developed by said drag generator in accordance with the diameter of material on said supply reel whereby the tension applied to the material as it is unwound from said supply reel may be maintained at an approximately constant predetermined value.

5. In a roll winding system, in combination, a supply reel for material, a roller disposed for winding material as it is unwound from the supply reel, motive means for driving said roller, a main generator for supplying power to said motive means, a motor for driving said main generator, a dynamo-electric machine connected in parallel circuit relation to said main generator, a series motor for driving said machine, and an auxiliary generator arranged to be driven by said supply reel, when material is unwound therefrom, and disposed to supply power to said series motor, said auxiliary generator acting as a drag upon the supply reel whereby uniform tension may be maintained in the material as it is unwound therefrom.

6. In a roll winding system, in combination, a supply reel for material, a roller disposed for winding material as it is unwound from the supply reel, motive means for driving said roller, a main generator for supplying power to said motive means, a motor for driving said main generator, a dynamo-electric machine connected in parallel circuit relation to said main generator, a series motor for driving said machine, an auxiliary generator arranged to be driven by said supply reel, when material is unwound therefrom, and disposed to supply power to said series motor, said auxiliary generator acting as a drag upon the supply reel whereby uniform tension may be maintained in the material as it is unwound therefrom, and means for regulating the current developed by said auxiliary generator at an approximately constant value in response to changes in the diameter of material on said supply reel.

In testimony whereof, I have hereunto subscribed my name this 10th day of July, 1929.

STEPHEN A. STAEGE.